(12) United States Patent
Konya

(10) Patent No.: US 6,757,926 B2
(45) Date of Patent: Jul. 6, 2004

(54) RETRACTABLE BRIDGE EXTENSION SYSTEM

(75) Inventor: Kazuhide Konya, Mercer Island, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/242,116

(22) Filed: Sep. 12, 2002

(65) Prior Publication Data

US 2004/0060128 A1 Apr. 1, 2004

(51) Int. Cl.⁷ .................................................. E01D 1/00
(52) U.S. Cl. ....................................................... 14/71.5
(58) Field of Search ............................... 14/71.1, 71.3, 14/71.5

(56) References Cited

U.S. PATENT DOCUMENTS

| | | | | |
|---|---|---|---|---|
| 3,639,934 A | * | 2/1972 | Eggert, Jr. | 14/71.5 |
| 3,693,204 A | * | 9/1972 | Eggert, Jr. | 14/71.5 |
| 3,703,737 A | * | 11/1972 | Eggert, Jr. | 14/71.5 |
| 3,816,867 A | * | 6/1974 | Shirzad et al. | 14/71.5 |
| 4,120,067 A | * | 10/1978 | Hone et al. | 14/71.5 |
| 4,333,195 A | * | 6/1982 | Lichti | 14/71.5 |
| 5,016,309 A | * | 5/1991 | Vollmerhausen | 14/71.7 |
| 5,105,495 A | * | 4/1992 | Larson et al. | 14/71.5 |
| 5,267,368 A | * | 12/1993 | Saunders | 14/71.5 |
| 6,195,826 B1 | * | 3/2001 | LeBaron et al. | 14/71.5 |

* cited by examiner

Primary Examiner—Gary S. Hartmann
(74) Attorney, Agent, or Firm—Ann K. Galbraith, Esq.

(57) ABSTRACT

A servicing bridge (10) for servicing a vehicle (14) is provided including a main bridge section (16) that is mechanically coupled to a terminal (22) and a bridgehead (18). A retractable bridge extension system (12) is mechanically coupled to the bridgehead (18). The extension system (12) includes a bridge extension (30) that mates a bridge floor (36) to a vehicle floor (38) and extends the servicing bridge (10). A bridge extension bumper (32) is mechanically coupled to the bridge extension (30) and dampens contact between the bridge extension (30) and the vehicle (14). An extension mechanism (34) is mechanically coupled to the bridge extension (30) and the servicing bridge (10) and actuates the bridge extension (30).

20 Claims, 3 Drawing Sheets

RETRACTABLE BRIDGE EXTENSION SYSTEM

RELATED APPLICATION

The present invention is related to U.S. patent Application Ser. No. 10/242,179 entitled "Multi-Purpose Aircraft Servicing Bridge" filed simultaneously herewith and incorporated by reference herein. The present invention is also related to U.S. patent application Ser. No. 09/791,441 entitled "Passenger Loading Bridge Pad" filed in February 2001.

TECHNICAL FIELD

The present invention relates generally to aeronautical vehicle systems, and more particularly, to a system for mating an aircraft with a strake to a servicing bridge.

BACKGROUND OF THE INVENTION

Passenger loading bridges are utilized to provide ingress and egress of passengers between an airline terminal and an aircraft. A typical passenger loading bridge includes a bridgehead for mating to a passenger-loading door. The bridgehead typically has a rubber bumper along a bridgehead opening that dampens contact between the bridgehead and an aircraft fuselage just below a doorsill.

Current passenger loading bridge designs are not suitable for aircraft that have a strake. Various aircraft wing designs currently exist in aircraft industry. These aircraft have wings that are sufficiently positioned away from the passenger-loading door and do not interfere with the bridge mating to the aircraft. Unfortunately, the existing bridgehead design interferes with an aircraft design that has a strake extending to the passenger door.

A strake refers to a wing leading edge near a wing root attachment to the fuselage that extends forward to a passenger loading door area. A portion of the wing or strake may be located several inches below a sill of the passenger door and interferes with positioning of the loading bridge.

The interference of the bridgehead with the strake causes difficulty during mating of the bridgehead with the fuselage. The interference can result in damage to the strake or the fuselage, which is costly and therefore undesirable. Also, when interference exists between the strake and the bridgehead a significant gap typically exists between the fuselage and the bridgehead, rendering the current passenger bridge impractical for passenger use.

It is therefore, desirable to provide a passenger bridge that is able to mate to an aircraft having a strake without interference between the bridgehead and the strake while maintaining practical ingress and egress of passengers between the aircraft and the airline terminal.

SUMMARY OF THE INVENTION

The present invention provides a system for mating an aircraft with a strake to a servicing bridge. A servicing bridge for servicing a vehicle is provided including a main bridge section that is mechanically coupled to a terminal and a bridgehead. A retractable bridge extension system is mechanically coupled to the bridgehead. The extension system includes a bridge extension that mates a bridge floor to a vehicle floor and extends the servicing bridge. A bridge extension bumper is mechanically coupled to the bridge extension and dampens contact between the bridge extension and the vehicle. An extension mechanism is mechanically coupled to the bridge extension and the servicing bridge and actuates the bridge extension.

The present invention has several advantages over existing passenger bridges. One advantage of the present invention is that it provides a mechanism for mating a bridge floor to a cabin floor without interference with the strake that is cost effective.

Another advantage of the present invention is that it prevents aircraft damage, including damage to an aircraft fuselage and to the strake, during mating of the servicing bridge to the aircraft.

Furthermore, the present invention provides an additional extension to accommodate for varying size strakes.

The present invention itself, together with further objects and attendant advantages, will be best understood by reference to the following detailed description, taken in conjunction with the accompanying drawing.

DETAILED DESCRIPTION OF THE PREFERRED EMBODIMENT

Figure 1:
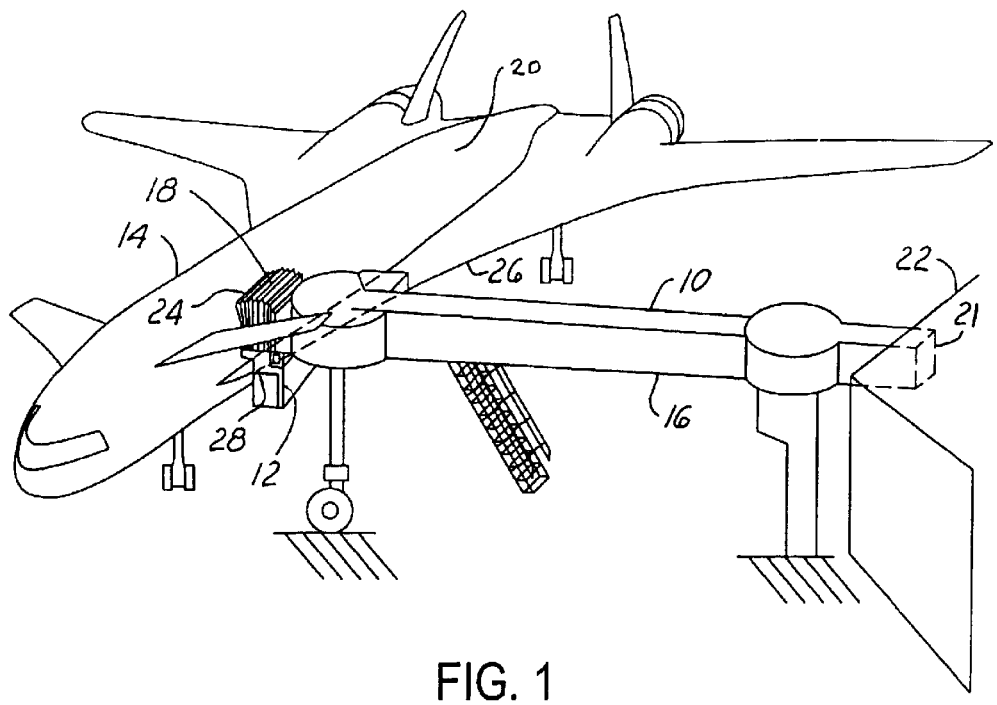
FIG. 1 is a perspective view of a servicing bridge having a retractable bridge extension system for an aircraft in accordance with an embodiment of the present invention.

In each of the following figures, the same reference numerals are used to refer to the same components. While the present invention is described with respect to a system for mating an aircraft with a strake to a servicing bridge, the present invention may be adapted for various applications and systems including: aeronautical systems, land-based vehicle systems, or other applications or systems known in the art.

In the following description, various operating parameters and components are described for one constructed embodiment. These specific parameters and components are included as examples and are not meant to be limiting.

Also, in the following description the term "mate" refers to a spatial and contacting relationship between to systems, components, or devices. For example, a bridgehead when being used for egress and ingress to an aircraft is mated to the aircraft. The bridgehead is in close proximity with the aircraft to allow passage therebetween. The bridgehead may be mechanically coupled to, may be in direct or indirect contact with, or may simply be in close proximity with the aircraft.

Referring now to FIG. 1, a perspective view of a servicing bridge 10 having a retractable bridge extension system 12 for an aircraft 14 in accordance with an embodiment of the present invention is shown. The serving bridge 10 includes a main bridge section 16, that may have a telescoping section, and a bridgehead 18 that mates to a fuselage 20 of the aircraft 14. The servicing bridge 10 provides passage of people, luggage, gear, and supplies from a gate door 21 of a terminal 22, through the servicing bridge 10, to a servicing door 24 of the aircraft 14. The servicing bridge 10 may have multiple passageways and servicing units, not shown. For further explanation of the passageways and servicing units see related application, Ser. No. 10/242,179. The extension system 12 is mechanically coupled to the bridgehead 18 and extends the bridgehead 18 over a forward portion of the wing 26 or strake 28 and prevents interference with the strake 28. The extension system 12 is described in further detail below.

Figure 2:
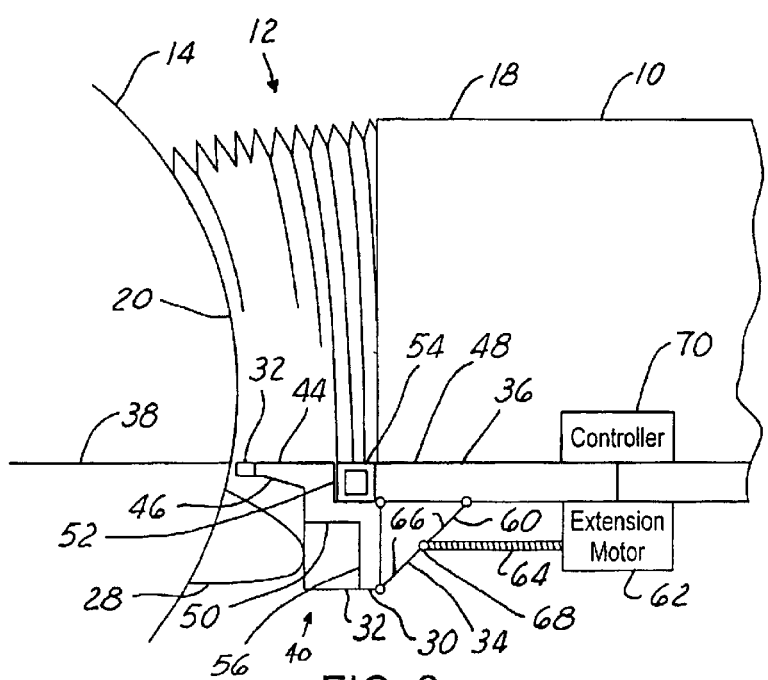
FIG. 2 is a side view of the retractable bridge extension system in accordance with an embodiment of the present invention.
Figure 3:
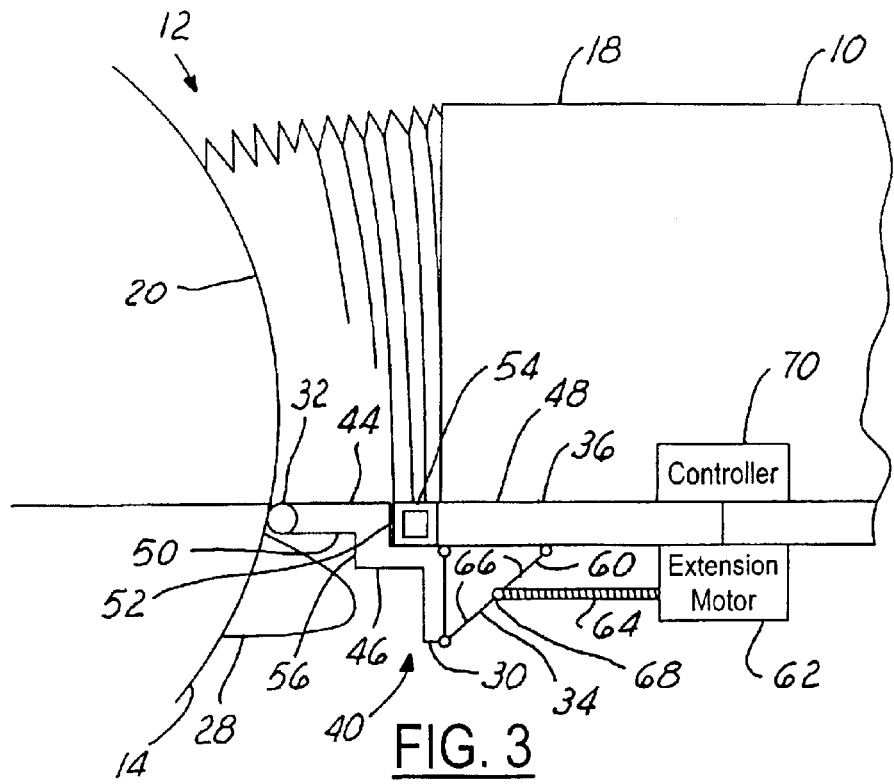
FIG. 3 is a side view of a retractable bridge extension system in accordance with another embodiment of the present invention.

Referring now to FIGS. 2 and 3, a side view of the extension system 12 in accordance with multiple embodiments of the present invention are shown. The extension system 12 includes a bridge extension 30, one or more bridge extension bumpers 32, and an extension mechanism 34. The bridge extension 30 mates a bridge floor 36 to a vehicle floor such as a cabin floor 38. The bumpers 32 are mechanically coupled to the bridge extension 30 and dampen contact between the bridge extension 30 and the aircraft 14. The extension mechanism 34 is mechanically coupled to the bridge extension 30 and the servicing bridge 10 and actuates the bridge extension 30.

Figure 4:
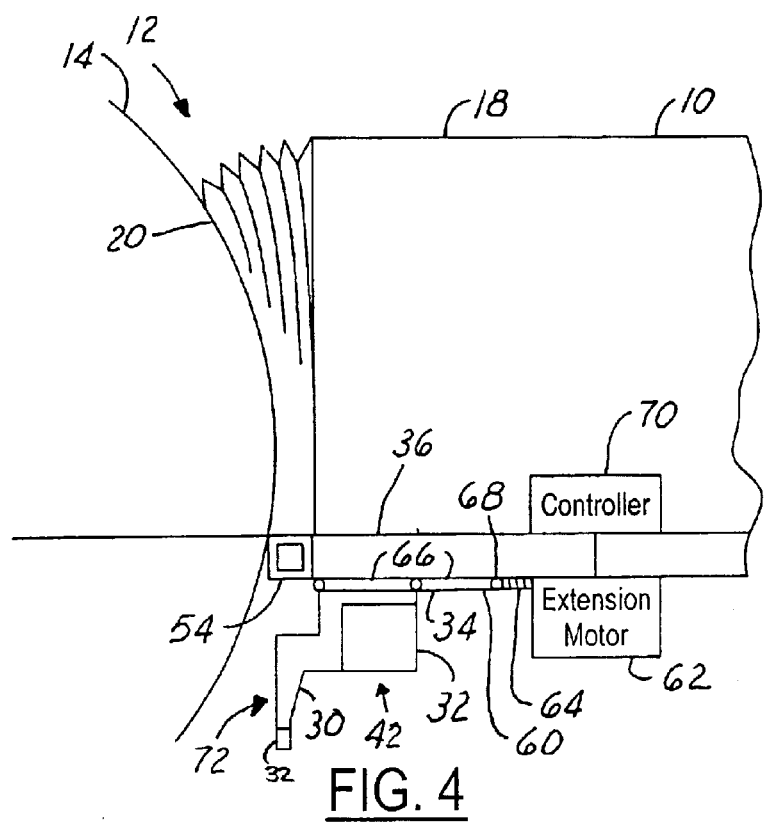
FIG. 4 is a side view of the retractable bridge extension system, of FIG. 1, in a stowed state and in accordance with an embodiment of the present invention.

The bridge extension 30 may be of various size, shape, and style. The bridge extension 30 has a deployed state 40, as shown, and a stowed state 42, which is best seen in FIG. 4. The bridge extension 30 has an upper surface 44 and a lower surface 46. The upper surface 44 is approximately level with a top surface 48 of the bridge floor 36 and height of the servicing bridge 10 is adjustable by a separate mechanism, not shown, to provide smooth transitions of people and supplies from the bridge floor 36 to the cabin floor 38. The bridge extension 30 is formed such that along a lower contour 50, of the lower surface 46, the bridge extension 30 maintains at least a predetermined distance from the strake 28 when mated to the aircraft 14, to prevent interference with the strake 28.

The bridge extension 30 also has a terminal side notch 52, allowing the bridge extension 30 to mechanically couple the bridgehead 18 and extend around a bridge floor bumper 54, which may be a bottom loading bridge bumper. Bottom loading bridge bumpers and associated advantages are described in detail in U.S. patent application Ser. No. 09/791,441.

The extension bumpers 32 may also be of various size, shape, and style. In an embodiment of the present invention the extension bumpers 32 are bottom loading bridge bumpers, as described above. For example, the extension bumpers 32 may be coupled to the bridge extension 30 on a vehicle side 56 of the bridge extension 30 to provide dampening when mating the bridge extension 30 to the aircraft 14, between the bridge extension 30 and the fuselage 20. The extension bumpers 32 may be coupled to the lower surface 46 to provide dampening between the bridge extension 30 and the strake 28. Various combinations of extension bumpers may be used.

The extension mechanism 34 includes an extension linkage assembly 60 that is mechanically coupled to the bridge extension 30 and the bridgehead 18. An extension motor 62 is mechanically coupled to and below the bridge floor 36 and to the linkage assembly 60 via a worm gear 64. The worm gear 64 is mechanically coupled to a pair of linkages 66 by a knuckle 68. A controller 70 is electrically coupled to the motor 62 and generates an actuation signal. The motor 62 actuates the linkage assembly 60 in response to the actuation signal. Although, the linkage assembly 60 includes the worm gear 64, the pair of linkages 66, and the knuckle 68 the linkage assembly 60 may contain other mechanical coupling devices known in the art.

The controller 70 may be microprocessor based such as a computer having a central processing unit, memory (RAM and/or ROM), and associated input and output buses or other combination of logic devices. The controller 70 may be a portion of a central main control unit, a bridge control unit, or a stand-alone controller.

Referring now to FIG. 4, a side view of the extension system 12 in the stowed state 42 and in accordance with an embodiment of the present invention is shown. The motor 62 actuates the linkage assembly 60 to rotate the bridge extension 30 into a stowed position 72 below the bridge floor 36. The worm gear 64 is turned to translate the knuckle 68 towards the motor 62 and fold the pair of links 66. Of course, the worm gear may rotate as to translate the knuckle 68 away from the motor 62 to fold the pair of links as to lay on each other. In the stowed position 72 the bridge 10 may be utilized as a conventional bridge for an aircraft without a strake.

Figure 5:
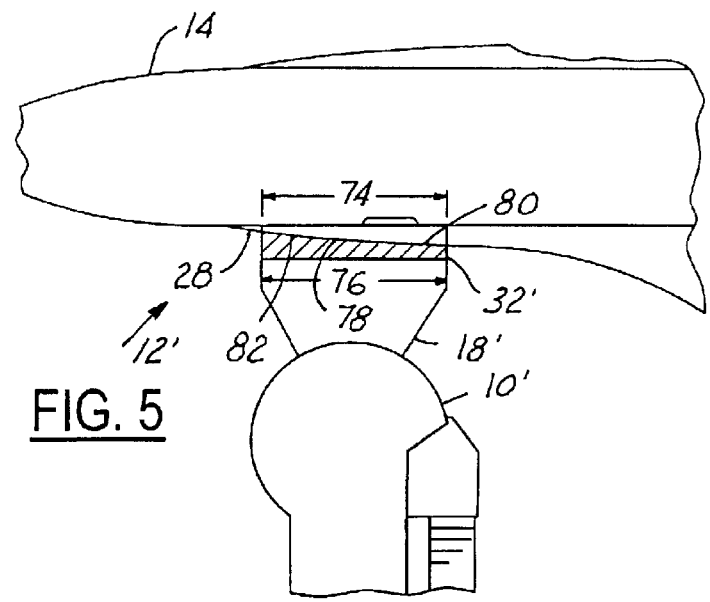
FIG. 5 is a top view of a retractable bridge extension system illustrating an extension bumper in accordance with another embodiment of the present invention.

Referring now to FIG. 5, a top view of a retractable bridge extension system 12' illustrating an extension bumper 321 in accordance with another embodiment of the present invention is shown. The extension bumper 32' has lateral bumper length 74, which is approximately equal to a lateral bridgehead length 76 of the bridgehead 18', thereby, distributing contact load between the bridgehead 18 and the aircraft 14. Also, the extension bumper 32' has a vehicle side contour 78 that corresponds with a strake contour 80, allowing the aircraft 14 to be parked perpendicular to the servicing bridge 10' and providing continuous and proportional dampening across a contact surface 82 of and between the extension bumper 32' and the strike 28. The distribution of contact load in combination with the corresponding contours 78 and 80 further aids in preventing damage to the aircraft 14.

Figure 6:
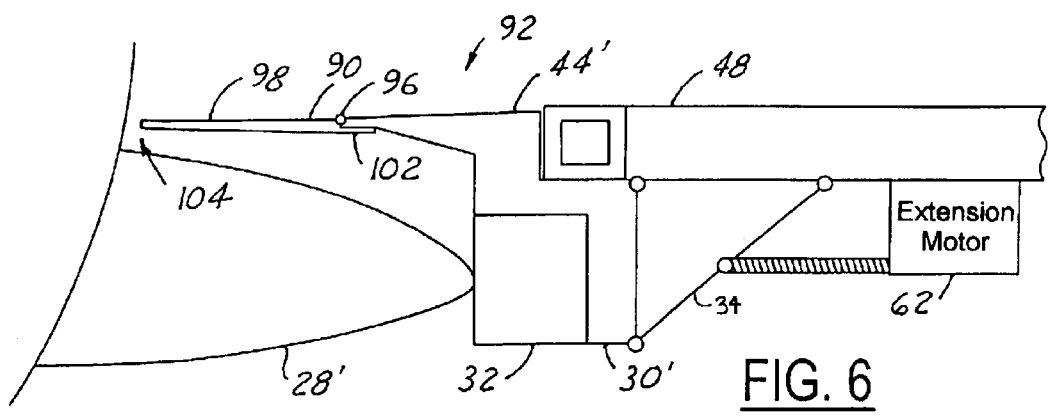
FIG. 6 is a side view of an extension platform in a deployed state and in accordance with an embodiment of the present invention.
Figure 7:
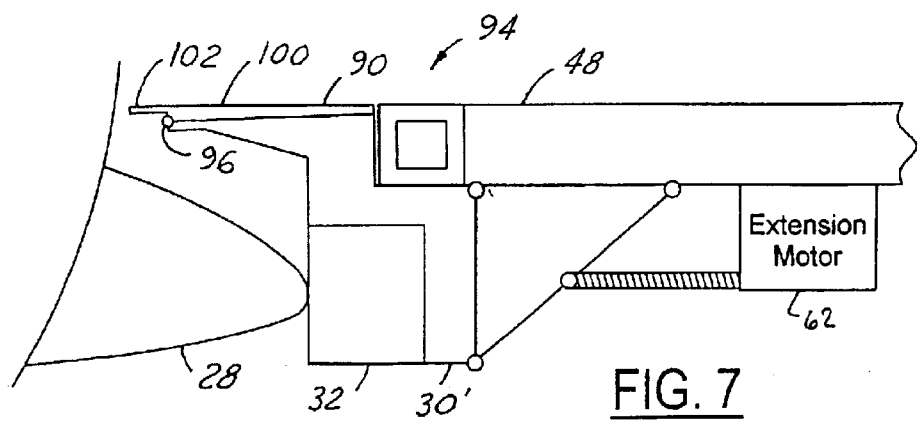
FIG. 7 is a side view of the extension platform in a stowed state and in accordance with an embodiment of the present invention.

Referring now to FIGS. 6 and 7, side views of an extension platform 90 in a deployed state 92 and in a stowed state 94 in accordance with an embodiment of the present invention are shown. The extension platform 90 may also be of various size, shape, and style. The extension platform 90 is mechanically coupled to a bridge extension 30' via hinge 96. Although, hinge 96 is used other mechanically coupling devices known in the art may also be used. The extension platform 90 has a first surface 98 that is approximately level to an upper surface 441 when the platform 90 is in the deployed state 92 and a second surface 100 that is approximately level to a top surface 48 when the platform 90 is in the stowed state 94.

The platform 90 includes a support bracket 102 that is integrally formed as part of the platform 90. The support bracket 102 prevents the platform 90 from rotating past a determined point 104 when the platform 90 is in a deployed state 92 to maintain levelness between the first surface 98 and the upper surface 48. The support bracket 102 also further extends length of the bridge extension 30 when in the stowed state 94.

The present invention therefore provides an extension system that mates with a cabin floor without interference with a strake. The extension mechanism prevents damage to the aircraft fuselage and strake. The present invention is versatile in that it may not only be utilized for conventional style aircraft but may also be utilized for aircraft having varying size strakes.

The above-described apparatus and method, to one skilled in the art, is capable of being adapted for various applications and systems including: aeronautical systems, land-based vehicle systems, or other applications or systems known in the art. The above-described invention can also be varied without deviating from the true scope of the invention.

What is claimed is:

1. A retractable bridge extension system for a servicing bridge comprising:
    a bridge extension mating a bridge floor to a vehicle floor and extending the servicing bridge, said bridge extension configured to extend over and be non-interfering with a strake, defined as a leading edge of a wing near a root attachment to a fuselage that extends to a passenger loading door area, of a vehicle;
    at least one bridge extension bumper mechanically coupled to said bridge extension and dampening contact between said bridge extension and said vehicle; and
    an extension mechanism mechanically coupled to said bridge extension and the servicing bridge and actuating said bridge extension.

2. A system as in claim 1 wherein said extension mechanism comprises an extension linkage assembly.

3. A system as in claim 2 wherein said extension mechanism comprises a motor mechanically coupled to and actuates said extension linkage assembly.

4. A system as in claim 1 further comprising a controller electrically coupled to said extension mechanism and generating an actuation signal.

5. A system as in claim 4 wherein said extension mechanism comprises:
    an extension linkage assembly mechanically coupled to said bridge extension and said servicing bridge;
    a motor mechanically coupled to said extension linkage assembly; and
    a controller electrically coupled to said motor and generating an actuation signal;
    said motor actuating said extension linkage assembly in response to said actuation signal.

6. A system as in claim 1 wherein said bridge extension has a deployed state and a retracted state.

7. A system as in claim 1 wherein said at least one bridge extension bumper dampens contact between said bridge extension and said fuselage.

8. A system as in claim 1 wherein said at least one bridge extension bumper dampens contact between said bridge extension and said strake.

9. A system as in claim 1 wherein said at least one bridge extension bumper is a bottom loading bridge bumper.

10. A system as in claim 1 wherein said bridge extension comprises a lower contour and maintains at least a predetermined distance from said strake along said lower contour.

11. A system as in claim 1 wherein said at least one bridge extension bumper has a mating contour that corresponds to a contour of said vehicle.

12. A system as in claim 1 wherein said at least one bridge extension bumper extends laterally across a significant portion of said bridgehead.

13. A system as in claim 1 further comprising an extension platform mechanically coupled to said bridge extension and further extending the servicing bridge.

14. A system as in claim 13 wherein said extension platform has a deployed state and a stowed state.

15. A system as in claim 14 wherein said extension platform comprises:
    a first surface that is approximately level with an upper surface of said bridge extension when in said deployed state; and
    a second surface that is approximately level with a top surface of said bridge floor when in said stowed state.

16. A system as in claim 1 wherein said bridge extension overhangs a strake of said vehicle.

17. A servicing bridge for servicing a vehicle comprising;
    a main bridge section mechanically coupling a terminal to a bridgehead; and
    a retractable bridge extension system comprising;
        a bridge extension mechanically coupled to said bridgehead and mating a bridge floor to a vehicle floor and extending the servicing bridge, said bridge extension configured to extend over and be non-interfering with a strake, defined as a leading edge of a wing near a root attachment to a fuselage that extends to a passenger loading door area, of a vehicle;
        at least one bridge extension bumper mechanically coupled to said bridge extension and dampening contact between said bridge extension and the vehicle; and
        an extension mechanism mechanically coupled to said bridge extension and the servicing bridge and actuating said bridge extension.

18. A bridge as in claim 17 wherein said extension mechanism comprises:
    an extension linkage assembly mechanically coupled to said bridge extension and said servicing bridge;
    a motor mechanically coupled to said extension linkage assembly; and
    a controller electrically coupled to said motor and generating an actuation signal;
    said motor actuating said extension linkage assembly in response to said actuation signal.

19. A bridge as in claim 17 wherein said bridgehead mates with the vehicle directly when said bridge extension is in a stowed state.

20. A bridge as in claim 17 wherein said retractable bridge extension system further comprises an extension platform mechanically coupled to and further extending the servicing bridge.

* * * * *